(12) United States Patent
Venkatachala et al.

(10) Patent No.: US 12,344,385 B2
(45) Date of Patent: Jul. 1, 2025

(54) LOAD ADJUSTABLE AND REUSABLE MECHANICAL RESTRAINT FOR AIRCRAFT EVACUATION SLIDE/RAFT SYSTEMS

(71) Applicant: GOODRICH CORPORATION, Charlotte, NC (US)

(72) Inventors: Adithya Nagara Venkatachala, Bangalore (IN); Guruprasad Srikanta Prasad, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 1230 days.

(21) Appl. No.: 17/126,754

(22) Filed: Dec. 18, 2020

(65) Prior Publication Data

US 2022/0017228 A1 Jan. 20, 2022

(30) Foreign Application Priority Data

Jul. 18, 2020 (IN) .............................. 202041030651

(51) Int. Cl.
| | | |
|---|---|---|
| *B64D 25/14* | (2006.01) | |
| *F16B 2/16* | (2006.01) | |
| *F16B 7/04* | (2006.01) | |
| *F16B 21/16* | (2006.01) | |
| *F16L 37/23* | (2006.01) | |

(52) U.S. Cl.
CPC ................ *B64D 25/14* (2013.01); *F16B 2/16* (2013.01); *F16B 7/042* (2013.01); *F16B 21/165* (2013.01); *F16L 37/23* (2013.01)

(58) Field of Classification Search
CPC .......... F16B 21/165; F16B 2/16; F16B 7/042; F16B 19/109; F16B 7/20; Y10T 24/45529; Y10T 24/45592; B64D 25/14
See application file for complete search history.

(56) References Cited

U.S. PATENT DOCUMENTS

| | | | | |
|---|---|---|---|---|
| 104,884 | A * | 6/1870 | Reinshagen ............ | F16B 7/182 403/349 |
| 1,864,466 | A * | 6/1932 | Peterson ............. | B25B 23/0035 81/177.85 |
| 2,536,702 | A * | 1/1951 | Scheiwer ................ | F16L 37/23 285/379 |
| 2,673,750 | A * | 3/1954 | Scheiwer ................ | F16L 37/23 285/277 |
| 2,860,893 | A * | 11/1958 | Clark ...................... | F16L 37/23 285/98 |

(Continued)

*Primary Examiner* — Andrew J Triggs
(74) *Attorney, Agent, or Firm* — SNELL & WILMER L.L.P.

(57) ABSTRACT

A releasable restraint for an evacuation system includes a plug body and a socket body. A ball, a plunger, a first spring member, and an adjustable fastener are disposed at least partially within the plug body. A spring force of the first spring member is adjustable in response to moving the adjustable fastener with respect to the plug body. The first spring member urges the plunger against the ball, and in response, the ball extends through a sidewall of the plug body and at least partially through a sidewall of the socket body to lock the plug body to the socket body. In response to a tensile force applied to the releasable restraint, the ball is configured to retract at least partially into the plug body, against the urging of the first spring member, to release the socket body from the plug body.

17 Claims, 7 Drawing Sheets

(56) References Cited

U.S. PATENT DOCUMENTS

| | | | | |
|---|---|---|---|---|
| 3,944,023 A | | 3/1976 | Fisher | |
| 3,988,818 A | * | 11/1976 | Allison | F16C 11/0671 280/93.511 |
| 4,114,853 A | * | 9/1978 | Medvick | F16L 37/23 251/149.6 |
| 4,526,262 A | | 7/1985 | Malcolm | |
| 4,567,977 A | * | 2/1986 | Fisher | B64D 25/14 193/25 B |
| 4,617,975 A | * | 10/1986 | Rabushka | F16L 37/23 137/614.04 |
| 4,865,077 A | * | 9/1989 | Batchen | F16L 37/33 137/614.04 |
| 5,240,361 A | * | 8/1993 | Armstrong | F16B 19/109 269/48.2 |
| 5,303,944 A | * | 4/1994 | Kalmus | B62K 19/30 74/551.8 |
| 5,411,350 A | * | 5/1995 | Breault | F16L 37/24 403/324 |
| 5,433,548 A | * | 7/1995 | Roberts | B25B 23/0014 81/177.85 |
| 5,741,084 A | * | 4/1998 | Del Rio | A61B 17/1633 285/376 |
| 5,879,166 A | * | 3/1999 | Wang | H01R 24/52 439/63 |
| 6,260,570 B1 | * | 7/2001 | Wass | F16K 31/56 441/41 |
| 6,269,836 B1 | * | 8/2001 | Monti | F16L 55/1015 285/1 |
| 6,297,741 B1 | * | 10/2001 | Higgins | F16B 7/20 439/337 |
| 6,557,329 B2 | | 5/2003 | Schmidt | |
| 6,847,009 B2 | | 1/2005 | Stuart | |
| 6,884,099 B1 | * | 4/2005 | Cannon | H01R 13/62933 439/314 |
| 6,939,073 B1 | * | 9/2005 | Ahmed | F16B 31/00 411/433 |
| 7,114,956 B2 | * | 10/2006 | Kreitzer | H01R 24/52 439/63 |
| 8,430,686 B2 | * | 4/2013 | Sheehan | H01R 13/74 439/551 |
| 10,457,408 B2 | | 10/2019 | Haynes et al. | |
| 2003/0057698 A1 | * | 3/2003 | Parrott | F16L 55/1015 285/1 |
| 2008/0276401 A1 | * | 11/2008 | Renius | B60S 1/342 15/250.3 |
| 2014/0109415 A1 | * | 4/2014 | Levsen | B26B 25/002 403/2 |
| 2015/0247598 A1 | * | 9/2015 | Bruckner | F16L 21/00 285/317 |
| 2015/0375579 A1 | * | 12/2015 | Summers | H01F 27/02 301/5.1 |
| 2016/0017905 A1 | * | 1/2016 | Cascolan | F16B 7/042 403/374.2 |
| 2016/0040694 A1 | * | 2/2016 | Cascolan | F16B 1/00 403/326 |
| 2018/0172191 A1 | * | 6/2018 | Takezawa | F16L 27/06 |
| 2018/0210483 A1 | * | 7/2018 | Santiago | B64D 25/16 |
| 2018/0273192 A1 | * | 9/2018 | Haynes | B64D 25/14 |
| 2020/0224817 A1 | * | 7/2020 | Schulz | F16L 59/184 |
| 2022/0079611 A1 | * | 3/2022 | Lee | A61B 34/70 |
| 2022/0146030 A1 | * | 5/2022 | Meyer | F16L 37/30 |
| 2022/0252094 A1 | * | 8/2022 | Maloney | F16B 1/04 |
| 2023/0240793 A1 | * | 8/2023 | Soto | A61B 34/30 211/85.13 |

* cited by examiner

LOAD ADJUSTABLE AND REUSABLE MECHANICAL RESTRAINT FOR AIRCRAFT EVACUATION SLIDE/RAFT SYSTEMS

CROSS REFERENCE TO RELATED APPLICATIONS

This application is a non-provisional of, and claims priority to, and the benefit of India Provisional Application No. 202041030651 with DAS Code 5E1A, entitled "LOAD ADJUSTABLE AND REUSABLE MECHANICAL RESTRAINT FOR AIRCRAFT EVACUATION SLIDE/RAFT SYSTEMS," filed on Jul. 18, 2020, which is hereby incorporated by reference in its entirety.

FIELD

The present disclosure relates to inflatable evacuation systems and, in particular, to restraint release systems and methods for inflatables.

BACKGROUND

Emergency evacuation inflatables may be used to exit an aircraft absent a jet way or other suitable means of egress for passengers. The inflatable may deploy from a door sill or a side of the aircraft fuselage, for example. The inflatable deployment is controlled by restraints placed throughout the length of the inflatable which release in stages in response to internal inflatable pressure.

SUMMARY

A releasable restraint for an evacuation system is disclosed comprising a plug body comprising a first bore, the first bore comprising a longitudinal axis, a ball disposed at least partially within the first bore, a plunger disposed in the first bore, a first spring member disposed in the first bore, an adjustable fastener coupled to the plug body, wherein a spring force of the first spring member is adjustable in response to moving the adjustable fastener with respect to the plug body, and a socket body comprising a second bore configured to receive a first end of the plug body, wherein the first spring member urges the plunger against the ball, and in response, the ball extends through a sidewall of the plug body and at least partially through a sidewall of the socket body to lock the plug body to the socket body.

In various embodiments, in response to a tensile force applied to the releasable restraint, the ball is configured to retract at least partially into the first bore, against the urging of the first spring member, to release the socket body from the plug body.

In various embodiments, the ball is configured to move substantially perpendicular to the longitudinal axis with respect to the plug body.

In various embodiments, the plunger is configured to move with respect to the plug body along the longitudinal axis in the first bore.

In various embodiments, the plug body is open to the first bore at a second end of the plug body.

In various embodiments, the releasable restraint further comprises a ball aperture disposed in the sidewall of the plug body, wherein the ball is disposed at least partially in the ball aperture.

In various embodiments, the socket body is open to the second bore at a first end of the socket body.

In various embodiments, the releasable restraint further comprises a stopping surface disposed in the sidewall of the socket body, wherein the ball is configured to extend from the plug body and rest against the stopping surface.

In various embodiments, the releasable restraint further comprises a second spring disposed in the second bore, wherein the second spring member urges the ball against the stopping surface of the socket body.

In various embodiments, the socket body is configured to receive the first end of the plug body into the second bore in the socket body against the urging of the second spring.

In various embodiments, the releasable restraint further comprises a slot disposed in the sidewall of the socket body, wherein the ball is at least partially disposed in the slot.

In various embodiments, the slot comprises a U-shaped geometry.

An evacuation system is disclosed, comprising an inflatable configured to be deployed from an aircraft, a first strap coupled to the inflatable, a second strap coupled to the inflatable, and a releasable restraint. The releasable restraint comprises a plug body comprising a first bore, the first bore comprising a longitudinal axis, a ball disposed at least partially within the first bore, a plunger disposed in the first bore, a first spring member disposed in the first bore, an adjustable fastener coupled to the plug body, wherein a spring force of the first spring member is adjustable in response to moving the adjustable fastener with respect to the plug body, and a socket body comprising a second bore configured to receive a first end of the plug body. The first spring member urges the plunger against the ball, and in response, the ball extends through a sidewall of the plug body and at least partially through a sidewall of the socket body to lock the plug body to the socket body.

In various embodiments, in response to a tensile force applied to the releasable restraint, the ball is configured to retract at least partially into the first bore, against the urging of the first spring member, to release the socket body from the plug body.

In various embodiments, the ball is configured to move substantially perpendicular to the longitudinal axis with respect to the plug body, and the plunger is configured to move with respect to the plug body along the longitudinal axis in the first bore.

In various embodiments, the plug body is open to the first bore at a second end of the plug body, and the socket body is open to the second bore at a first end of the socket body.

In various embodiments, evacuation system further comprises a ball aperture disposed in the sidewall of the plug body, wherein the ball is disposed at least partially in the ball aperture.

In various embodiments, evacuation system further comprises a stopping surface disposed in the sidewall of the socket body, wherein the ball is configured to extend from the plug body and rest against the stopping surface.

In various embodiments, evacuation system further comprises a second spring disposed in the second bore, wherein the second spring member urges the ball against the stopping surface of the socket body, wherein the socket body is configured to receive the first end of the plug body into the second bore in the socket body against the urging of the second spring.

In various embodiments, evacuation system further comprises a slot disposed in the sidewall of the socket body, wherein the ball is at least partially disposed in the slot.

A method for assembling a releasable restraint is disclosed, comprising moving a ball at least partially into a first bore of a plug body, the first bore comprising a longitudinal axis, moving a plunger into the first bore of the plug body, moving a first spring member into the first bore of the plug body; and moving an adjustable fastener at least partially into the first bore of the plug body, wherein a spring force of the first spring member is adjustable in response to moving the adjustable fastener with respect to the plug body.

In various embodiments, the method further comprises moving a second spring into a second bore of a socket body, and moving a first end of the plug body into the second bore of the socket body against an urging of the second spring.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Inflatable evacuation systems according to the present disclosure may extend from an aircraft structure, such as a fuselage or a wing, for example, to an exit surface in a fully deployed position. During deployment, a plurality of restraints may aid in controlling the inflation process of the inflatable system. The restraints may be configured to de-couple in response to internal inflatable system pressure.

A releasable restraint is provided. Releasable restraints, according to the present disclosure, may provide reusability of the restraint, repeatability in its load characteristics, cost-savings, and dependability. Releasable restraints, according to the present disclosure, may be retrofittable into existing evacuation systems. Releasable restraints, according to the present disclosure, may accommodate multiple restraint loads, may be tested before and/or after usage, and allow for ease of inspection. Releasable restraints, according to the present disclosure, may allow for a narrow factor of safety. Releasable restraints, according to the present disclosure, may comprise interchangeable parts, providing ease of installation and/or re-installation. Releasable restraints, according to the present disclosure, may minimize failure.

An evacuation slide may undergo multiple deployment tests during its development, qualification, and certification stage. An evacuation slide may comprise multiple (e.g., four or five) restraints. In this regard, releasable restraints, according to the present disclosure, may reduce development cost due to its re-usability.

Figure 1:
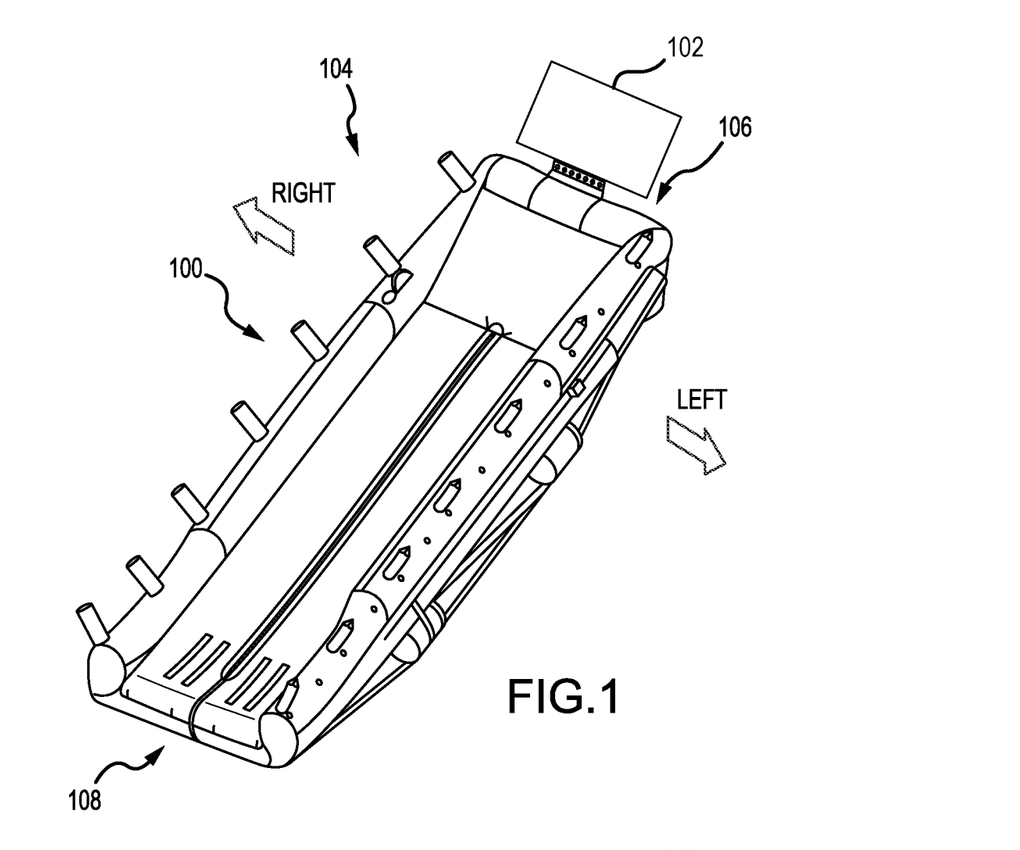
FIG. 1 illustrates a perspective view of an evacuation slide in a deployed position, in accordance with various embodiments.

With reference to FIG. 1, an evacuation system 104 is illustrated, in accordance with various embodiments. Evacuation system 104 may comprise an evacuation slide 100. Evacuation slide 100 may comprise a head end 106 and a toe end 108. Head end 106 may be coupled to an aircraft structure 102, schematically illustrated in FIG. 1. Aircraft structure 102 may comprise a fuselage, a wing, or any other aircraft structure. Evacuation slide 100 may comprise an inflatable slide. FIG. 1 illustrates evacuation slide 100 in an inflated and/or deployed position. Evacuation slide 100 may comprise a single-lane slide, a dual-lane slide, or any other number of lanes. Toe end 108 may contact an exit surface in response to evacuation slide 100 being deployed.

Figure 2:
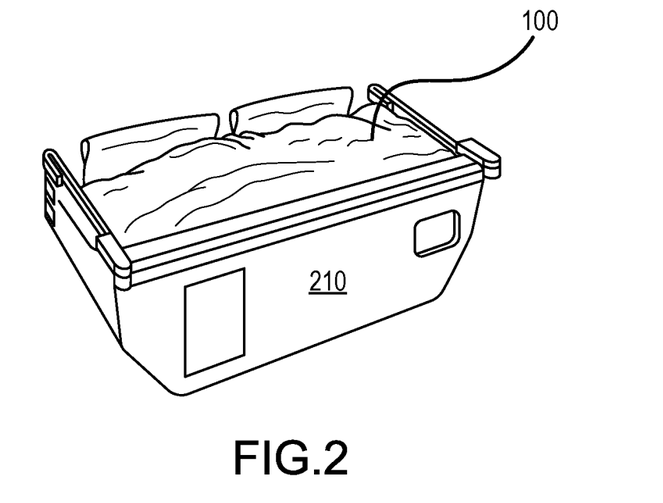
FIG. 2 illustrates a perspective view of an evacuation slide in a stowed position, in accordance with various embodiments.

With reference to FIG. 2, evacuation slide 100 is illustrated in a stowed and/or packed position. In this regard, evacuation slide 100 may be stowed in a packboard 210. In various embodiments, evacuation slide 100 may be folded in the stowed position. In various embodiments, evacuation slide 100 may be deployed from packboard 210 in response to opening an emergency exit door. Packboard 210 may be coupled to an aircraft in an installed position. In various embodiments, the packboard 210 may include a blow-out panel which opens in response to deployment of evacuation slide 100 through which opening the inflatable may exit the packboard 210. In various embodiments, the packboard 210 may be mounted behind an aircraft door which deploys when actuated and said aircraft door is opened. In this regard, evacuation slide 100 may be configured to be deployed from an aircraft.

Figures 3A, 3B:
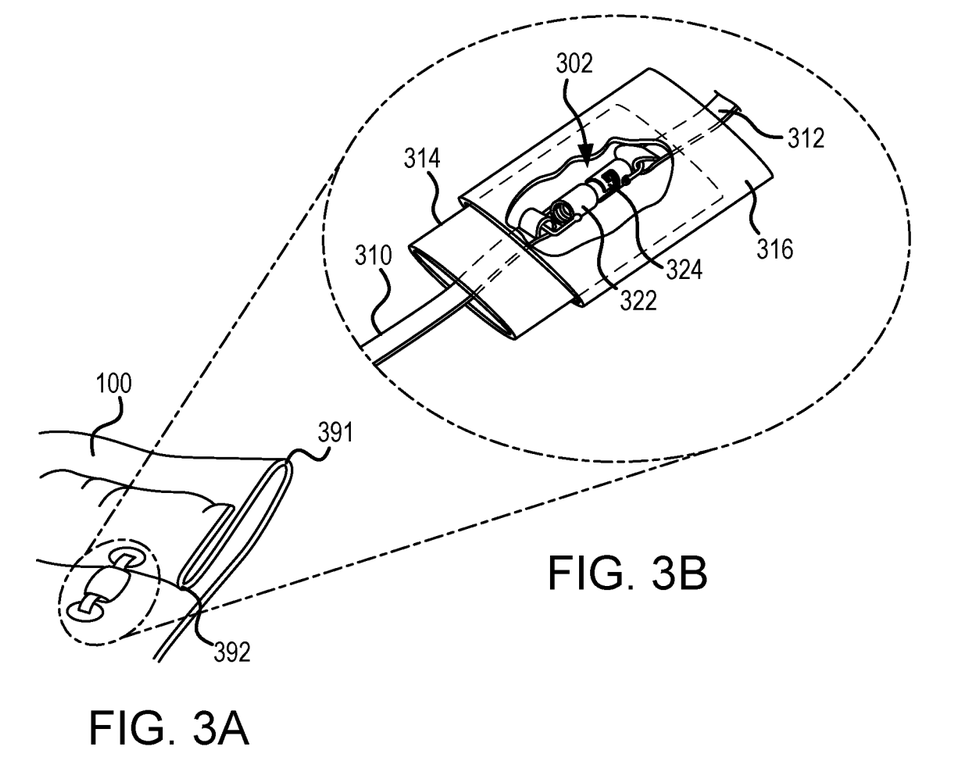
FIGS. 3A, 3B, and 3C illustrate a restraint aiding in retaining the evacuation slide in a folded position, in accordance with various embodiments.

With reference to FIG. 3A, evacuation slide 100 is illustrated in a folded position, in accordance with various embodiments. For example, evacuation slide 100 may include a plurality of folds, including first fold 391 and second fold 392, when evacuation slide 100 is in the folded or stowed position. With additional reference to FIG. 3B, a releasable restraint 302 may aid in maintaining first fold 391 and/or second fold 392. Releasable restraint 302 may aid in staged deployment of evacuation slide 100. Evacuation slide 100 may unfold in response to releasable restraint 302 separating under tension due to the internal pressure of evacuation slide 100.

In various embodiments, releasable restraint 302 may be configured to separate in response to an internal pressure in evacuation slide 100. For example, a gas cylinder may supply a flow of pressurized fluid to evacuation slide 100 in response to evacuation slide 100 being deployed. Evacuation slide 100 may begin to inflate and an internal pressure of evacuation slide 100 may increase. Releasable restraint 302 may maintain evacuation slide 100 in a folded position until the internal pressure has increased above a predetermined threshold value. Evacuation slide 100 may unfold in response to releasable restraint 302 separating. In this regard, evacuation slide 100 may fully deploy in response to releasable restraint 302 separating.

Releasable restraint 302 may comprise a plug body 322 and a socket body 324. In various embodiments, plug body 322 and socket body 324 may be made from a metal material. In various embodiments, a first cover 314 may surround releasable restraint 302. A second cover 316 may surround releasable restraint 302. Second cover 316 may surround at least a portion of first cover 314. First cover 314 and second cover 316 may comprise a fabric. For example, first cover 314 and second cover 316 may comprise nylon, ballistic nylon, polypropylene, polyester, cotton, or any other suitable material. In various embodiments, the first cover 314 and second cover 316 may be omitted.

Figure 3C:
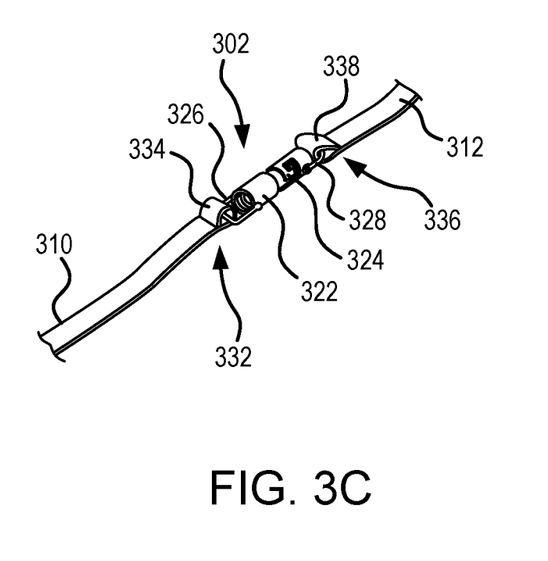

With reference to FIG. 3C, releasable restraint 302, first strap 310, and second strap 312 are illustrated with first cover 314 and second cover 316 omitted. First strap 310 may be coupled between evacuation slide 100 and releasable restraint 302. First strap 310 may be coupled to releasable restraint 302. First strap 310 may be coupled to releasable restraint 302 via a first connecting member 326, such as a shackle, or the like. An end 332 of first strap 310 may form a first loop 334. In various embodiments, first strap 310 may be looped around first connecting member 326 and sewn to itself. Stated differently, first connecting member 326 may be inserted through loop 334 and fastened to plug body 322. Second strap 312 may be coupled between evacuation slide 100 and releasable restraint 302. Second strap 312 may be coupled to releasable restraint 302. Second strap 312 may be coupled to releasable restraint 302 via a second connecting member 328, such as a shackle, or the like. An end 336 of second strap 312 may form a second loop 338. In various embodiments, second strap 312 may be looped around second connecting member 328 and sewn to itself. Stated differently, second connecting member 328 may be inserted through loop 338 and fastened to socket body 324.

In various embodiments, first strap 310 and/or second strap 312 may comprise a rope, tape, ribbon, webbing, or any other suitable strap. In various embodiments, first strap 310 and/or second strap 312 may comprise nylon, ballistic nylon, polypropylene, polyester, cotton, or any other suitable material.

Figure 4A:
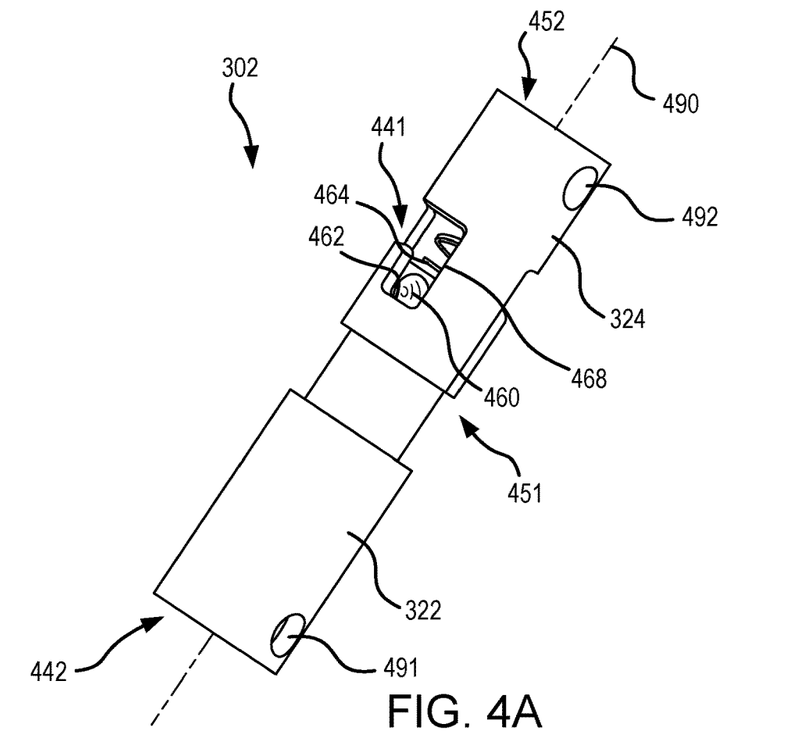
FIG. 4A and FIG. 4B illustrates perspective views of a releasable restraint in a locked position, in accordance with various embodiments.
Figure 4B:
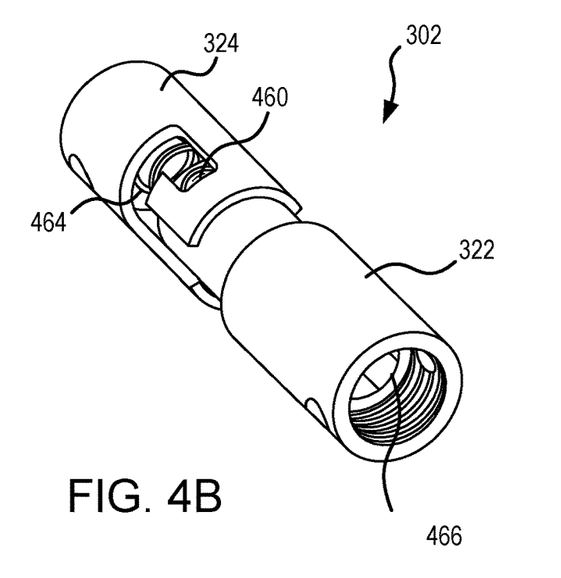

With reference to FIG. 4A and FIG. 4B, perspective views of releasable restraint 302 is illustrated, in accordance with various embodiments. Plug body 322 may comprise a cylindrical geometry. In various embodiments, plug body 322 comprises a connecting aperture 491 extending through plug body 322. Connecting aperture 491 may be configured to receive a connecting member, such as first connecting member 326 for example, for connecting releasable restraint 302 to an evacuation system strap, such as first strap 310 for example. Connecting aperture 491 may be oriented perpendicular with respect to a longitudinal axis 490 of the releasable restraint 302. Connecting aperture 491 may be disposed at a second end 442 of plug body 322. First end 441 of plug body 322 may be disposed within socket body 324.

Socket body 324 may comprise a cylindrical geometry. In various embodiments, socket body 324 comprises a connecting aperture 492 extending through socket body 324. Connecting aperture 492 may be configured to receive a connecting member, such as second connecting member 328 for example, for connecting releasable restraint 302 to an evacuation system strap, such as second strap 312 for example. Connecting aperture 492 may be oriented perpendicular with respect to longitudinal axis 490 of the releasable restraint 302. Connecting aperture 491 may be disposed at a second end 452 of socket body 324. First end 451 of socket body 324 may be configured to receive first end 441 of plug body 322. Socket body 324 may be configured to decouple from plug body 322 in response to an internal pressure in an inflatable, such as evacuation slide 100 for example.

In various embodiments, plug body 322 comprises a ball 460 extending through a sidewall of the plug body 322. Ball 460 may comprise a spherical geometry, in accordance with various embodiments. Ball 460 may be made from a metal material. Ball 460 may be retained at least partially within plug body 322. Ball 460 may extend through an aperture disposed in the sidewall of plug body 322. Ball 460 may engage a sidewall of socket body 324. In particular, ball 460 may engage a stopping surface 462 disposed in the sidewall of socket body 324. Ball 460 may be configured to extend from the plug body 322 and rest against the stopping surface 462. Releasable restraint 302 may further comprise a spring 464 (also referred to herein as a second spring) disposed in socket body 324. Spring 464 may comprise a coil spring. In various embodiments, spring 464 may comprise a coil spring, a Belleville washer, a leaf spring, or any other suitable spring, in accordance with various embodiments. Spring 464 may urge plug body 322, along longitudinal axis 490, away from socket body 324, thereby urging ball 460 against stopping surface 462.

In various embodiments, releasable restraint 302 further comprises an adjustable fastener 466 coupled to plug body 322. Adjustable fastener 466 may comprise a threaded fastener, such as a bolt or the like. Adjustable fastener 466 may be threadingly coupled to plug body 322. In response to a tensile force being applied to releasable restraint 302, stopping surface 462 may urge ball 460 to retract into plug body 322 to unlock plug body 322 from socket body 324.

Adjustable fastener 466 may be adjusted to vary a spring force acting on ball 460, thereby varying the magnitude of the tensile force at which the plug body 322 is released from socket body 324.

Figure 5A:
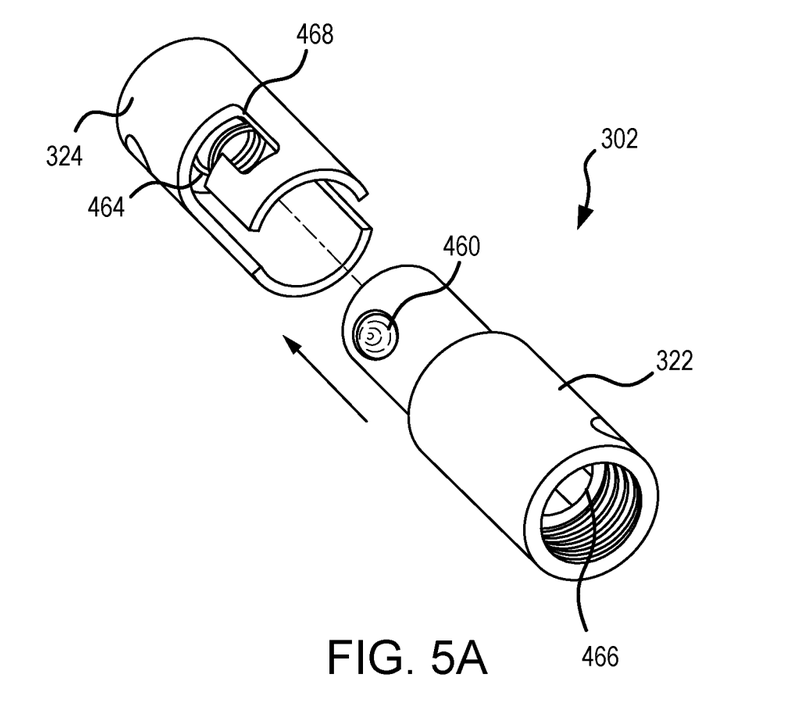
FIGS. 5A and 5B illustrates perspective views and a plug body being installed into a socket body, in accordance with various embodiments.
Figure 5B:
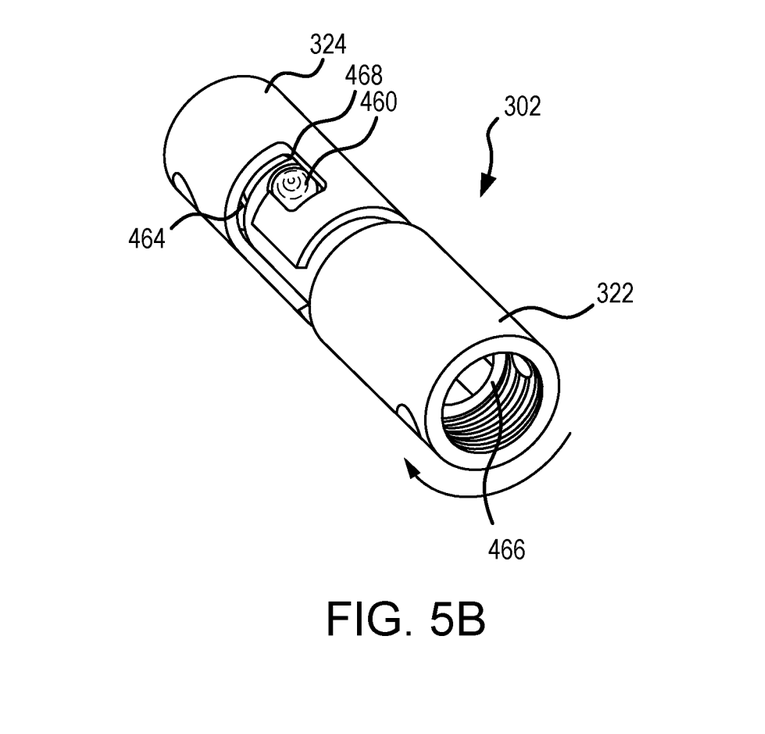

In various embodiments, socket body 324 may comprise a channel or slot 468 disposed in the sidewall 623 (see FIG. 6A) of socket body 324. Slot 468 may comprise a U-shape geometry extending from the first end 451 of socket body 324. To install plug body 322 into socket body 324, ball 460 may be aligned with an opening of the slot 468, with momentary reference to FIG. 5A. Plug body 322 may be pushed into socket body 324, wherein the ball 460 moves within a first longitudinally extending portion of the slot 468 as the first end 441 of the plug body 322 is moved into the socket body 324. Plug body 322 may then be rotated with respect to socket body 324, wherein the ball 460 moves within a transverse portion of the slot 468 as the plug body 322 is rotated with respect to the socket body 324. After the plug body 322 has been rotated, the plug body 322 may be released, wherein the spring 464 urges the ball 460 to move along a second longitudinally extending portion of the slot 468 until the ball 460 contacts the stopping surface 462, as illustrated in FIG. 4A. Stopping surface 462 may at least partially define sot 468. In this manner, spring 464 may retain the plug body 322 in a locked position with socket body 324.

Figure 6A:
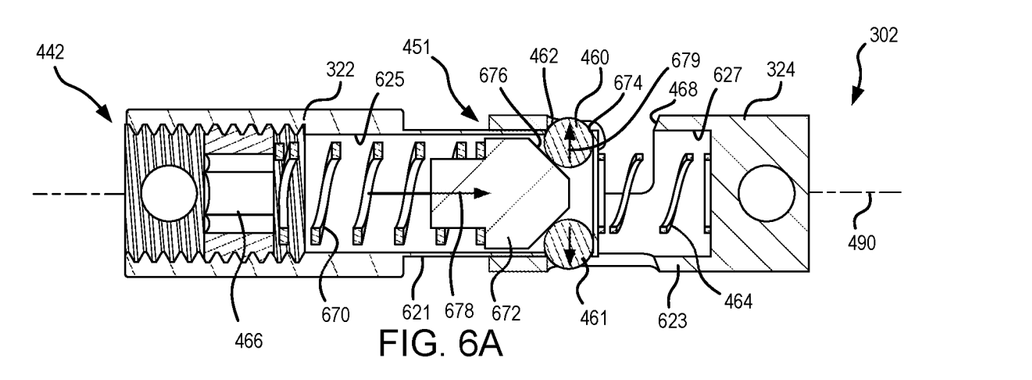
FIG. 6A illustrates a section view of the releasable restraint in a locked position, in accordance with various embodiments.

With reference to FIG. 6A, a section view of releasable restraint 302 in a locked position is illustrated, in accordance with various embodiments. Plug body 322 may comprise a bore 625 (also referred to herein as a first bore). Bore 625 may comprise longitudinal axis 490. Plug body 322 may be open to bore 625 at the second end 442 of the plug body 322. Ball 460 may be disposed at least partially within bore 625. Releasable restraint 302 may further comprise a spring 670 (also referred to herein as a first spring member) and a plunger 672 disposed in the bore 625. In various embodiments, spring 670 may comprise a coil spring, a Belleville washer, a leaf spring, or any other suitable spring, in accordance with various embodiments. Plunger 672 may be made from a metal material. Plunger 672 may be in contact with ball 460. Plunger 672 may be configured to translate within bore 625 along longitudinal axis 490 with respect to plug body 322. Spring 670 may urge plunger 672 against ball 460, thereby urging ball 460 to extend through a ball aperture 674 disposed in the sidewall 621 of plug body 322. Adjustable fastener 466 may be configured to adjust a spring force of spring 670 acting against plunger 672 and ball 460. For example, adjustable fastener 466 may be moved further into bore 625 (e.g., by tightening adjustable fastener 466) to compress spring 670, thereby increasing the spring force of spring 670 acting on ball 460. Conversely, adjustable fastener 466 may be moved away from plunger 672 (e.g., by loosening adjustable fastener 466) to decompress spring 670, thereby decreasing the spring force of spring 670 acting on ball 460.

In various embodiments, a mating surface 676 of plunger 672 may contact ball 460. Mating surface 676 may be oriented at an angle θ with respect to longitudinal axis 490. Angle θ may be between twenty degrees and seventy degrees (20°-70°), in accordance with various embodiments. Angle θ may be between thirty degrees and sixty degrees (30°-60°), in accordance with various embodiments. Angle θ may be between forty degrees and fifty degrees (40°-50°), in accordance with various embodiments. In this manner, the spring force, depicted by arrow 678, acting parallel longitudinal axis 490 between spring 670 and plunger 672 may be converted to a force, depicted by arrow 679, acting perpendicular to longitudinal axis 490 between mating surface 676 of plunger 672 and ball 460.

Socket body 324 may comprise a bore 627 (also referred to herein as a second bore). Bore 627 may be coaxial with longitudinal axis 490. Socket body 324 may be open to bore 627 at first end 451 of socket body 324. The first end of plug body 322 may be received within bore 627 against the urging of spring 464. Spring 464 may be disposed in the bore 627. In response to spring 670 urging plunger 672 towards ball 460, ball 460 is urged to extend through ball aperture 674 of plug body 322 and to extend at least partially into slot 468 of socket body 324 to lock the plug body 322 to the socket body 324.

Figure 6B:
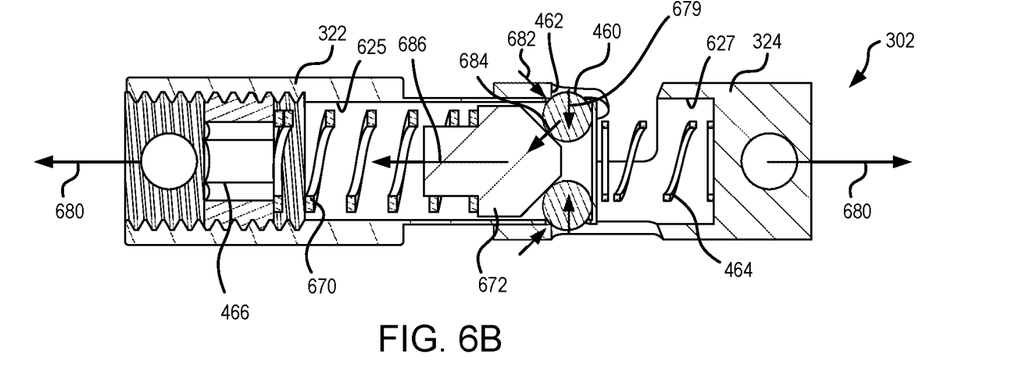
FIG. 6B illustrates a section view of the releasable restraint with a tensile force being applied thereto and a load being transferred between a stopping surface of the socket body and a ball of the plug body, in accordance with various embodiments.

With reference to FIG. 6B, and in response to a tensile force, depicted by arrows 680, applied to the releasable restraint 302, ball 460 may be configured to retract at least partially into bore 625, against the urging of spring 670, to release the socket body 324 from the plug body 322. Stated differently, in response to the tensile force 680, a load, depicted by arrow 682 may be transferred between stopping surface 462 and ball 460, urging ball 460 against plunger 672, thereby transferring a load, depicted by arrow 684, between ball 460 and plunger 672, thereby urging plunger 672 to retract, as illustrated by arrow 686, against the bias of spring 670. In this regard, ball 460 may be configured to move perpendicular to longitudinal axis 490 with respect to plug body 322 to lock and/or unlock plug body 322 to socket body 324. Furthermore, the magnitude of the tensile force at which load 682 overcomes the urging, or bias, of spring 670 acting against ball 460 may be varied by adjusting adjustable fastener 466. For example, tightening adjustable fastener 466 may compress spring 670 and increase the tensile force threshold for releasing plug body 322 from socket body 324. Conversely, loosening adjustable fastener 466 may extend spring 670 and decrease the tensile force threshold for releasing plug body 322 from socket body 324.

Figure 6C:
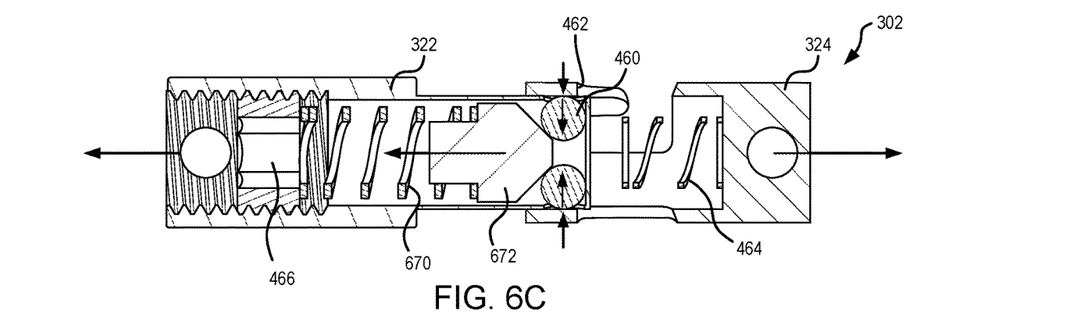
FIG. 6C illustrates a section view of the releasable restraint with a ball having cleared the socket body and the plug body being pulled away from the socket body, in accordance with various embodiments.
Figure 6D:
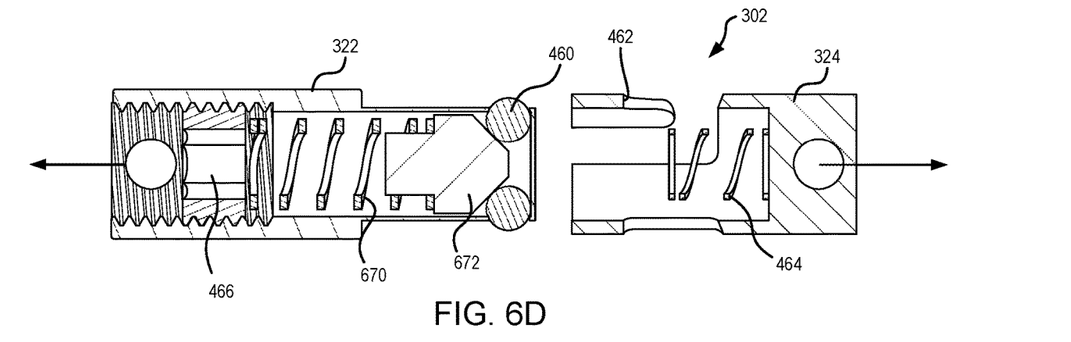
FIG. 6D illustrates a section view of the releasable restraint in an unlocked position with the socket body pulled away from the plug body, and the ball extending from the plug body in a reset position, in accordance with various embodiments.

With reference to FIG. 6C, ball 460 may continue to retract until ball 460 clears stopping surface 462, at which point the plug body 322 may continue to be pulled apart from socket body 324. With reference to FIG. 6D, releasable restraint 302 is illustrated with plug body 322 released from socket body 324. After being released from socket body 324, spring 670 may urge plunger 672 towards ball 460, thereby urging ball 460 to partially extend from ball aperture 674. In this manner, the plug body 322 automatically resets and is ready for being reinstalled into the socket body 324 for further use.

Releasable restraint 302 may comprise a second ball 461. Second ball 461 may be similar to ball 460. Second ball 461 may be disposed opposite plug body 322 from ball 460. Thus, plug body 322 may comprise a second ball aperture for second ball 461, socket body 324 may comprise a second slot for second ball 461, etc. Any number of balls may be used for locking plug body 322 to socket body 324, without departing from the scope of the present disclosure.

Figure 7:
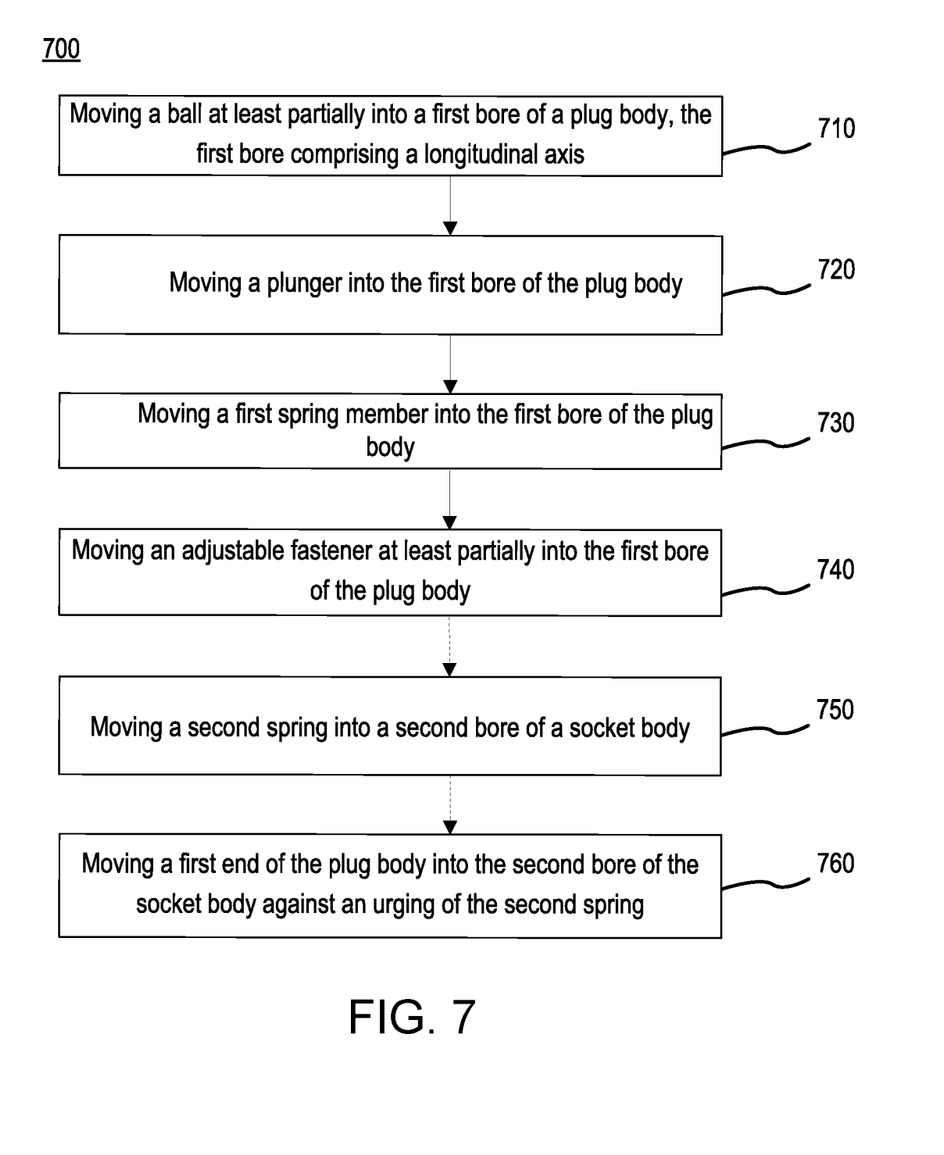
FIG. 7 illustrates a flow chart for a method of assembling a releasable restraint, in accordance with various embodiments.

With reference to FIG. 7, a flow chart for a method 700 for assembling a releasable restraint is illustrated, in accordance with various embodiments. Method 700 includes moving a ball at least partially into a first bore of a plug body, the first bore comprising a longitudinal axis (step 710). Method 700 includes moving a plunger into the first bore of the plug body (step 720). Method 700 includes moving a first spring member into the first bore of the plug body (step 730). Method 700 includes moving an adjustable fastener at least partially into the first bore of the plug body (step 740). Method 700 may further include moving a second spring into a second bore of a socket body (step 750). Method 700 may further include moving a first end of the plug body into the second bore of the socket body against an urging of the second spring (step 760).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A releasable restraint for an evacuation system comprising:
    a plug body defining a first bore, the first bore defining a first longitudinal axis;
    a ball disposed at least partially within the first bore;
    a plunger disposed in the first bore;
    a first spring member disposed in the first bore, the plunger is disposed between the first spring member and the ball;
    an adjustable fastener coupled to the plug body, the first spring member is disposed between the adjustable fastener and the plunger, and a spring force of the first spring member is adjustable in response to moving the adjustable fastener with respect to the plug body;
    a socket body defining a second bore defining a second longitudinal axis and configured to receive a first end of the plug body;
    a slot disposed in a sidewall of the socket body, the slot comprises a U-shaped geometry and extends through the sidewall in a direction perpendicular to the second longitudinal axis; and
    a second spring member disposed in the second bore, the second spring member is disposed between the first end of the plug body and the socket body, the socket body is configured to receive the first end of the plug body into the second bore in the socket body against the urging of the second spring member;
    wherein the first spring member urges the plunger against the ball, and in response, the ball extends through a sidewall of the plug body and at least partially through the slot in the sidewall of the socket body to lock the plug body to the socket body.

2. The releasable restraint of claim 1, wherein, in response to a tensile force applied to the releasable restraint, the ball is configured to retract at least partially into the first bore, against the urging of the first spring member, to release the socket body from the plug body, and the ball is configured to move substantially perpendicular to the longitudinal axis with respect to the plug body.

3. The releasable restraint of claim 2, wherein the plunger is configured to move with respect to the plug body along the longitudinal axis in the first bore.

4. The releasable restraint of claim 1, wherein the plug body is open to the first bore at a second end of the plug body.

5. The releasable restraint of claim 1, further comprising a ball aperture disposed in the sidewall of the plug body, wherein the ball is disposed at least partially in the ball aperture.

6. The releasable restraint of claim 1, wherein the socket body is open to the second bore at a first end of the socket body.

7. The releasable restraint of claim 1, further comprising a stopping surface disposed in the sidewall of the socket body, wherein the ball is configured to extend from the plug body and rest against the stopping surface, and the second spring member urges the ball against the stopping surface of the socket body.

8. The releasable restraint of claim 1, wherein, in response to a tensile force applied to the releasable restraint, the ball is urged radially inward by the socket body against a mating surface of the plunger, thereby urging the plunger to move longitudinally with respect to the plug body.

9. The releasable restraint of claim 1, wherein the adjustable fastener is a threaded fastener threadingly coupled to the plug body, wherein an outside diameter surface of the adjustable fastener is threadingly coupled to an inside diameter surface of the plug body, and rotation of the adjustable fastener about the longitudinal axis with respect to the plug body causes the adjustable fastener to translate along the longitudinal axis with respect to the plug body.

10. The releasable restraint of claim 1, wherein the adjustable fastener is configured to be rotated with respect to the plug body in a first rotational direction to compress the first spring and a second rotational direction to decompress the first spring.

11. The releasable restraint of claim 1, wherein the adjustable fastener abuts the first spring member.

12. An evacuation system, comprising:
- an inflatable configured to be deployed from an aircraft;
- a first strap coupled to the inflatable;
- a second strap coupled to the inflatable; and
- a releasable restraint comprising:
  - a plug body defining a first bore, the first bore defining a first longitudinal axis;
  - a ball disposed at least partially within the first bore;
  - a plunger disposed in the first bore;
  - a first spring member disposed in the first bore, the plunger is disposed between the first spring member and the ball;
  - an adjustable fastener coupled to the plug body, the spring member is disposed between the adjustable fastener and the plunger, and a spring force of the first spring member is adjustable in response to moving the adjustable fastener with respect to the plug body;
  - a socket body defining a second bore defining a second longitudinal axis and configured to receive a first end of the plug body;
  - a slot disposed in a sidewall of the socket body, the slot comprises a U-shaped geometry and extends through the sidewall in a direction perpendicular to the second longitudinal axis; and
  - a second spring member disposed in the second bore, the second spring member is disposed between the first end of the plug body and the socket body, the socket body is configured to receive the first end of the plug body into the second bore in the socket body against the urging of the second spring member;
  - wherein the first spring member urges the plunger against the ball, and in response, the ball extends through a sidewall of the plug body and at least partially through the slot in the sidewall of the socket body to lock the plug body to the socket body.

13. The evacuation system of claim 12, wherein, in response to a tensile force applied to the releasable restraint, the ball is configured to retract at least partially into the first bore, against the urging of the first spring member, to release the socket body from the plug body,
- the ball is configured to move substantially perpendicular to the longitudinal axis with respect to the plug body, and
- the plunger is configured to move with respect to the plug body along the longitudinal axis in the first bore.

14. The evacuation system of claim 12, wherein the plug body is open to the first bore at a second end of the plug body, and
the socket body is open to the second bore at a first end of the socket body.

15. The evacuation system of claim 12, further comprising a ball aperture disposed in the sidewall of the plug body, wherein the ball is disposed at least partially in the ball aperture.

16. The evacuation system of claim 12, further comprising a stopping surface disposed in the sidewall of the socket body, wherein the ball is configured to extend from the plug body and rest against the stopping surface, and the second spring member urges the ball against the stopping surface of the socket body.

17. The evacuation system of claim 12, further comprising a slot disposed in the sidewall of the socket body, wherein the ball is at least partially disposed in the slot.

* * * * *